(12) United States Patent
Zhao et al.

(10) Patent No.: US 12,455,097 B2
(45) Date of Patent: Oct. 28, 2025

(54) HEATING PUMP COVER AND HEATING PUMP

(71) Applicant: BACKER HEATING TECHNOLOGIES (SHENZHEN) CO., LTD., Shenzhen (CN)

(72) Inventors: Kefeng Zhao, Shenzhen (CN); Taiping Zhou, Shenzhen (CN); Zaixing Zhou, Shenzhen (CN)

(73) Assignee: BACKER HEATING TECHNOLOGIES (SHENZHEN) CO., LTD., Shenzhen (CN)

( * ) Notice: Subject to any disclaimer, the term of this patent is extended or adjusted under 35 U.S.C. 154(b) by 807 days.

(21) Appl. No.: 17/748,612

(22) Filed: May 19, 2022

(65) Prior Publication Data
US 2023/0228453 A1    Jul. 20, 2023

(30) Foreign Application Priority Data
Jan. 20, 2022   (CN) .......................... 202220165559.X (51) Int. Cl.
| | |
|---|---|
| *F24H 1/10* | (2022.01) |
| *D06F 39/04* | (2006.01) |
| *F04D 29/40* | (2006.01) |
| *H05B 1/02* | (2006.01) |

(52) U.S. Cl.
CPC ............ *F24H 1/101* (2013.01); *D06F 39/04* (2013.01); *F04D 29/406* (2013.01); *H05B 1/0244* (2013.01)

(58) Field of Classification Search
None
See application file for complete search history.

(56) References Cited

U.S. PATENT DOCUMENTS

2006/0236999 A1 * 10/2006 Pleschinger .......... F24H 9/2028
126/373.1

FOREIGN PATENT DOCUMENTS

| CN | 102297506 | | 12/2011 | ............... F24H 1/00 |
|---|---|---|---|---|
| CN | 103573674 | | 2/2014 | ............. F04D 29/00 |
| CN | 206582176 | | 10/2017 | ............. F04D 29/58 |
| CN | 108167230 | A * | 6/2018 | ......... A47L 15/4225 |

OTHER PUBLICATIONS

European Search Report issued in EPO Application No. 22 175 264.5 dated Nov. 29, 2022, 6 pgs.

* cited by examiner

*Primary Examiner* — John J Norton
(74) *Attorney, Agent, or Firm* — HAYES SOLOWAY P.C.

(57) ABSTRACT

Disclosed are a heating pump cover and a heating pump. The heating pump cover comprises a cover body, a temperature control device, a raised part, and a heating body. The cover body has a first surface configured to be in contact with liquid on which the heating body is arranged and a second surface opposite to the first surface on which the temperature control device and the raised part are arranged. The raised part forms grooves on the first surface and the temperature control device is arranged on the raised part. The part of the heating body locates in the grooves has a first region which is in contact with the inner wall of the groove and a second region which is arranged interval with the inner wall of the groove.

14 Claims, 8 Drawing Sheets

HEATING PUMP COVER AND HEATING PUMP

CROSS REFERENCE TO RELATED APPLICATION

This application claims priority to Chinese Patent Application No. 202220165559.X, filed on Jan. 20, 2022. The content of all of which is incorporate herein by reference.

FIELD OF THE DISCLOSURE

The present disclosure relates to the technical field of a heating pump, and more particularly, to a heating pump cover and a heating pump.

BACKGROUND

In the prior art, a heating pump is commonly used in a plurality of household appliances, including a dishwasher. The heating pump is an important part of the dishwasher. Currently the heating pumps are all keeping a heating body connecting to a pump cover, while the pump cover is joining to a pump body connector before forming a water cavity. The heating body is powered on and generates heat, while water flowing through the water cavity is heated before flowing out. In an electric heater with such a structure, a thermostat is in contact with an upper surface of the pump cover, a lower surface of the pump cover connects with a part of the heating body, while the lower surface of the pump cover locating under the thermostat and the heating body are arranged at an interval, so that a water flow is able to flow through a gap between the pump cover under the thermostat and the heating body, thus it is possible to sense a temperature of the water flow in the pump. Between the thermostat and the upper surface of the pump cover, a temperature-sensitive sheet is further arranged, so it is possible to balance and conduct heat from an electric heating tube and a temperature of the water through the temperature-sensitive sheet.

However, by adopting such a method of adding the temperature-sensitive sheet, it increases a plurality of parts of the pump cover, and increases an assembly process and a complexity, as well as increases a production cost.

Therefore, the current technology needs to be improved and developed.

BRIEF SUMMARY OF THE DISCLOSURE

According to the defects in the prior art described above, the purpose of the present disclosure is providing a heating pump cover and a heating pump, in order to solve a technical problem in the prior art that, by adopting the method of adding the temperature-sensitive sheet, it increases the assembly process and the complexity, as well as increases the production cost.

To achieve the above mentioned goals, the technical solution of the present disclosure to solve the technical problems is as follows:

in one aspect, the present disclosure provides a heating pump cover, comprising: a cover body, the cover body has a first surface configured to be in contact with a liquid, and a second surface, opposite to the first surface;

A temperature control device, the temperature control device is arranged on the second surface;

Wherein the heating pump cover further comprises:

A raised part, the raised part is arranged on the second surface, and a side of the raised part locating on the first surface forms a groove, while the temperature control device is arranged on the raised part;

A heating body, the heating body fixedly connects to the first surface, a part of the heating body locating in the groove has a first region and a second region, the first region connects with an inner wall of the groove, and the second region is arranged at an interval with the inner wall of the groove.

In one embodiment, the first region is arranged on an upper surface of the heating body, at a radial direction, and the second region is arranged on one side or both sides of the first region.

In one embodiment, between the first region and the groove, there is a thermally conductive filler filled in, and the first region connects to the inner wall of the groove through the thermally conductive filler.

In one embodiment, the thermally conductive filler is a nickel-based solder or a copper-based solder.

In one embodiment, the first region is arranged outside the upper surface of the heating body, the second region is arranged inside the upper surface of the heating body; the second region comprises an inclined surface, and the inclined surface gradually approaches a center of the cover body in a top-to-bottom direction; the second region comprises an inclined surface, and the inclined surface gradually approaches the center of the cover body in a top-to-bottom direction;

In one embodiment, an inner sidewall of the groove is arranged obliquely, and an oblique direction is as same as a direction of the inclined surface.

In one embodiment, the raised part and the cover body are formed integrally.

In one embodiment, the second surface has an annular groove arranged; a partial area of the first surface locating below the annular groove connects to the heating body.

In one embodiment, the annular groove has a heat-conducting portion arranged inside, the heat-conducting portion and the raised part are arranged at an interval; the temperature control device is in contact with both the heat-conducting portion and the raised part.

In one embodiment, the heat-conducting portion comprises a heat-conducting convex plate, while the heat-conducting convex plate and the cover body are formed integrally.

In one embodiment, the heat-conducting portion comprises a heat-conducting block, while the heat-conducting block connects to a groove bottom surface of the annular groove.

In one embodiment, along a circumferential direction, the upper surface of the heating body connects to the first surface in whole.

In one embodiment, both ends of the heating body connect with a first connection end and a second connection end;

The first connection end connects transitionally to the heating body along a predetermined angle; the second connection end connects transitionally to the heating body along the predetermined angle;

The first connection end and the second connection end penetrate through the cover body and connect electrically with the temperature control device.

In one embodiment, the first surface of the cover body has a water blocking portion fixedly connected, and the water blocking portion covers two penetration positions in the cover body for the first connection end and the second connection end. .

In one embodiment, the water blocking portion is welded or brazed on both ends of the heating body, and connected with the heating body to form an annular shape.

In one embodiment, an outer contour of a cross-section of the heating body is one of a circle, an ellipse, a trapezoid and a rectangle.

In one embodiment, an edge of the cover body has a sealing portion arranged, the sealing portion is annular and has two sides in a radial direction, one side of the sealing portion connects with the cover body along a preset angle, while the cover body and the sealing portion are arranged integrally;

Another side of the sealing portion bends upward and forms a first bent portion, a side of the first bent portion facing the cover body forms a limit groove, and the limit groove is applied to limiting the pump body.

In one embodiment, the sealing portion further comprises:

A second bent portion, the second bent portion is arranged outside the first bent portion, and the second bent portion is applied to engaging the pump body.

In one embodiment, a side of the second bent portion facing the cover body forms a sealing space, and a sealing ring is arranged inside the sealing space, while the sealing ring is filled between an inner wall of the second bent portion and an outer wall of the pump body.

In one embodiment, the temperature control device comprises:

A fixed plate, the fixed plate is fixed on the second surface, and the fixed plate is a heat conducting board;

A temperature controller, the temperature controller connects to the fixed plate, and a bottom of the temperature controller is overlaid and arranged on the raised part;

A temperature safety device, the temperature safety device connects to the fixed plate, and a bottom of the temperature safety device is overlaid and arranged on the second surface;

A control plug, the control plug is fixedly arranged on the temperature controller and the temperature safety device, both sides of the control plug have a plurality of reinforcing ribs arranged respectively; an end of the heating body connects electrically to a first insertion plate and a second insertion plate arranged on both sides of the control plug.

In one embodiment, the control plug further comprises a third insertion plate and a fourth insertion plate, the third insertion plate and the fourth insertion plate are arranged in an interval; the third insertion plate and the fourth insertion plate connect in a circuit respectively with the temperature controller and the temperature safety device.

In one embodiment, the third insertion plate and the fourth insertion plate are parallel, and a distance between the third insertion plate and the fourth insertion plate is 5 mm±1 mm.

In one embodiment, the center of the cover body has a water inlet arranged, the water inlet has a surrounding edge arranged, and the surrounding edge is arranged continuously along a circumference of the water inlet;

The cover body has a plurality of grounding terminals arranged, and the grounding terminal has a connecting hole arranged, while the grounding terminals are arranged and overlaid fixedly on the cover body.

On another hand, based on a same concept, the present disclosure further provides a heating pump, comprising a pump body and the heating pump cover described above; the heating pump cover connects detachably to the pump body.

The present disclosure provides a heating pump cover and a heating pump, which includes the beneficial effect as follows: arranging the raised part on the cover body, and connecting the temperature control device directly to the raised part, a side of the raised part locating on the first surface forms a groove, so that the first region of the heating body connects with the inner wall of the groove, while the second region and the inner wall of the groove are arranged in an interval, making the water flow be able to flow through the gap between the second region and the groove, and the temperature of the water flow passes to the temperature control device by heat transferring through the raised part, so as to sense the temperature of the water flow in the pump; and by connecting the first region and the inner wall of the groove, the heat of the heating body is conducted directly through the raised part; the heat of the heating body at an connection part of the first region and the heat of water at the second region are transferred to the temperature control device on the raised part through the raised part, so as to monitor the temperature of water in the pump body and activate the temperature control device on time when abnormal cases, such as no water or no enough water, occur to avoid accident. Therefore, by connecting the first region of the heating body corresponding to the groove, and arranging the second region and the groove at an interval, a heat transfer function is achieved, without requiring any heat-sensitive sheets, thus reducing the parts of the pump cover, reducing the assembly process and the complexity, and reducing the production cost.

BRIEF DESCRIPTION OF THE DRAWINGS

In order to illustrate the technical solutions of the present disclosure clearer and more explicit, the accompanying drawings that need to be used in the description of the embodiments or the prior art are briefly introduced herein. Obviously, the drawings described hereafter in the following descriptions are only some embodiments of the present disclosure, for those of ordinary skills in the present art, a plurality of other drawings can also be obtained according to these drawings without any creative work.

Wherein 100-cover body; 110-first surface; 120-second surface; 130-water inlet; 131-surrounding edge; 140-grounding terminals; 200-raised part; 210-groove; 211-inner sidewall; 212-bottom inner wall; 220-annular groove; 300-temperature control device; 310-temperature sensor; 320-fuse; 330-fixed plate; 340-control plug; 350-first insertion plate; 351-second insertion plate; 352-third insertion plate; 353-fourth insertion plate; 400-heating body; 410-first region; 420-second region; 421-inclined surface; 430-thermally conductive filler; 440-first connection end; 441-second connection end; 450-water blocking portion; 500-heat-conducting portion; 510-heat-conducting convex plate; 511-concave groove; 520-heat-conducting block; 600-sealing portion; 610-first bent portion; 611-limiting groove; 620-second bent portion; 621-sealing space; 630-sealing ring; 700-pump body.

DETAILED DESCRIPTION OF THE EMBODIMENTS

To make the objectives, technical schemes and results of the present disclosure more explicit, further description will be made in detail to illustrate the present invention. It should be understood that the specific embodiments described herein are only used to explain the present invention, and are not intended to limit the scope of the present invention.

It should be noted that when a component is referred to as being "fixed to" or "arranged on" another component, it can be directly or indirectly located on the other component. When an element is referred to as being "connected to" another element, it can be directly or indirectly connected to the other element. Terms "top", "bottom", "left", "right", "front", "back", "vertical", "horizontal", "top", "bottom", "inside", "outer", and more, indicate an orientation or a position based on an orientation or a position shown in the drawings, which is only for the convenience of description, and should not be understood as a limitation on the technical solution. The terms "first" and "second" are used only for the purpose of description, and should not be understood as indicating or implying relative importance or implying indicating the number of technical features. "Plurality of" means two or more, unless being otherwise limited definitely and specifically.

Figure 1:
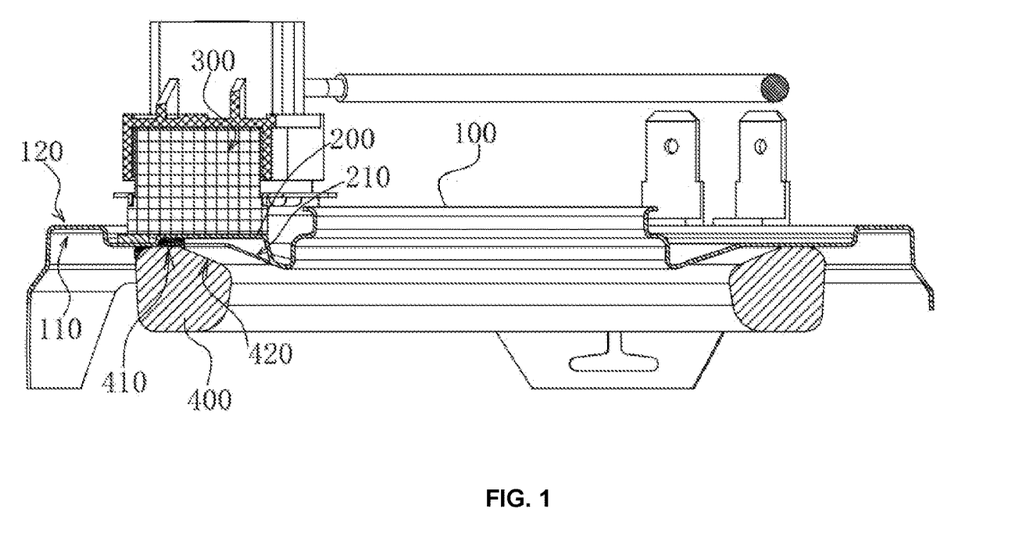
FIG.1 illustrates a cross-sectional view of a heating pump cover provided by an embodiment of the present disclosure.
Figure 2:
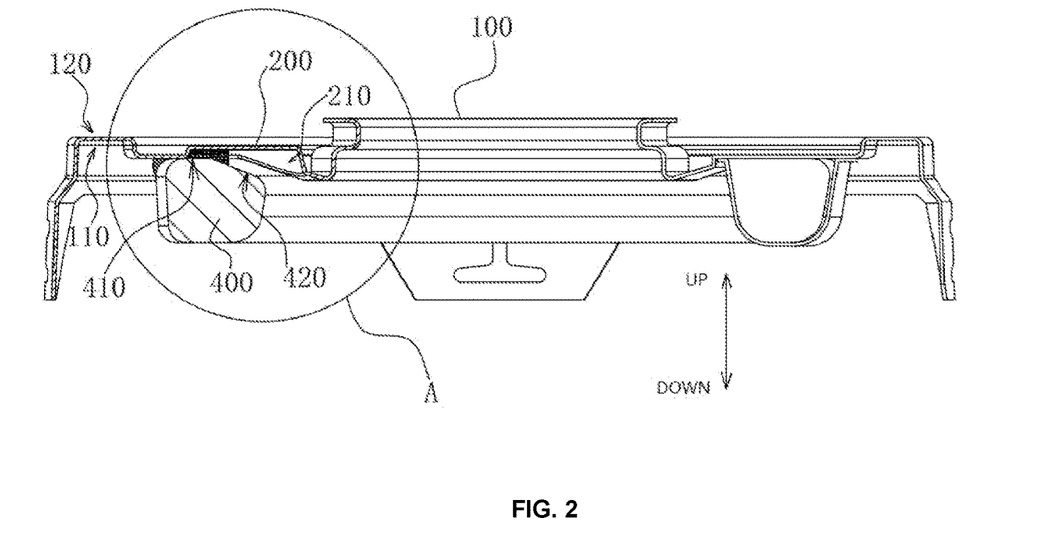
FIG.2 illustrates a cross-sectional view of a cover body portion of a heating pump cover provided by an embodiment of the present disclosure.
Figure 3:
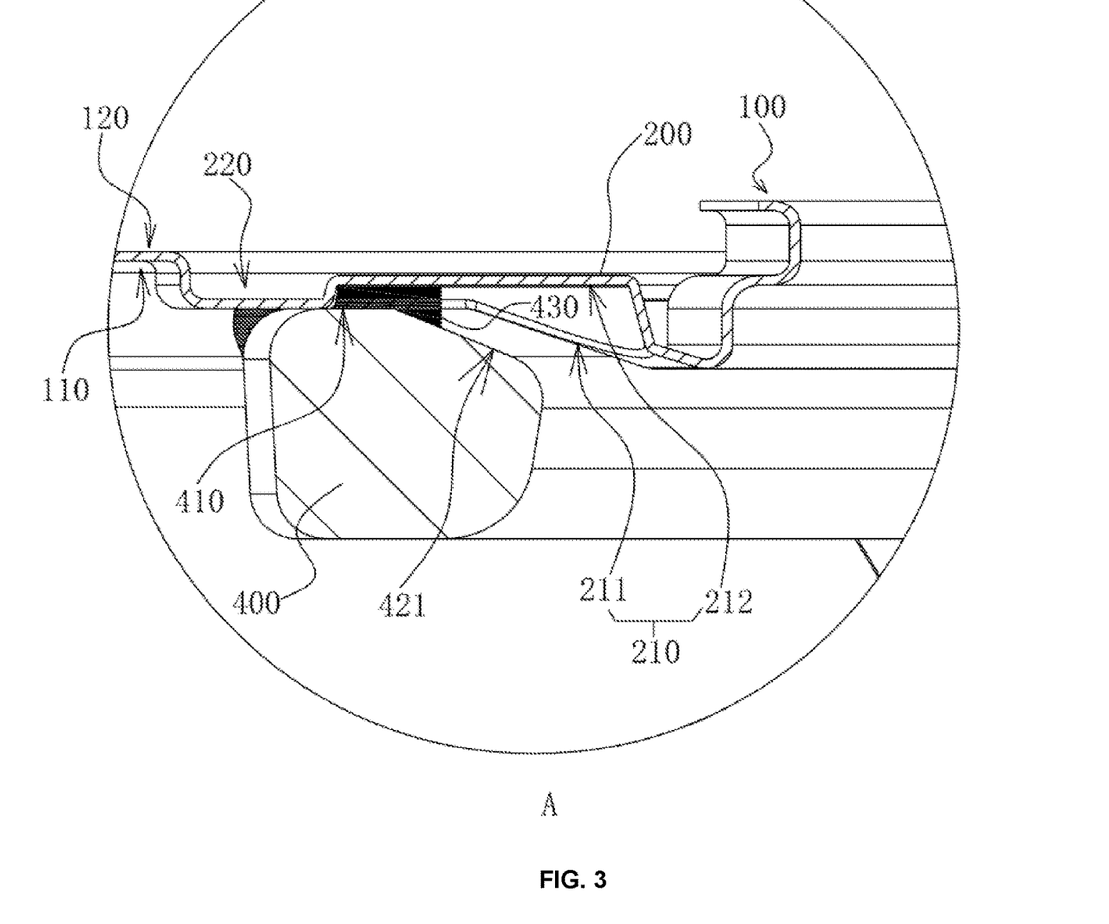
FIG.3 illustrates an enlarged view of part A in FIG. 2.
Figure 4:
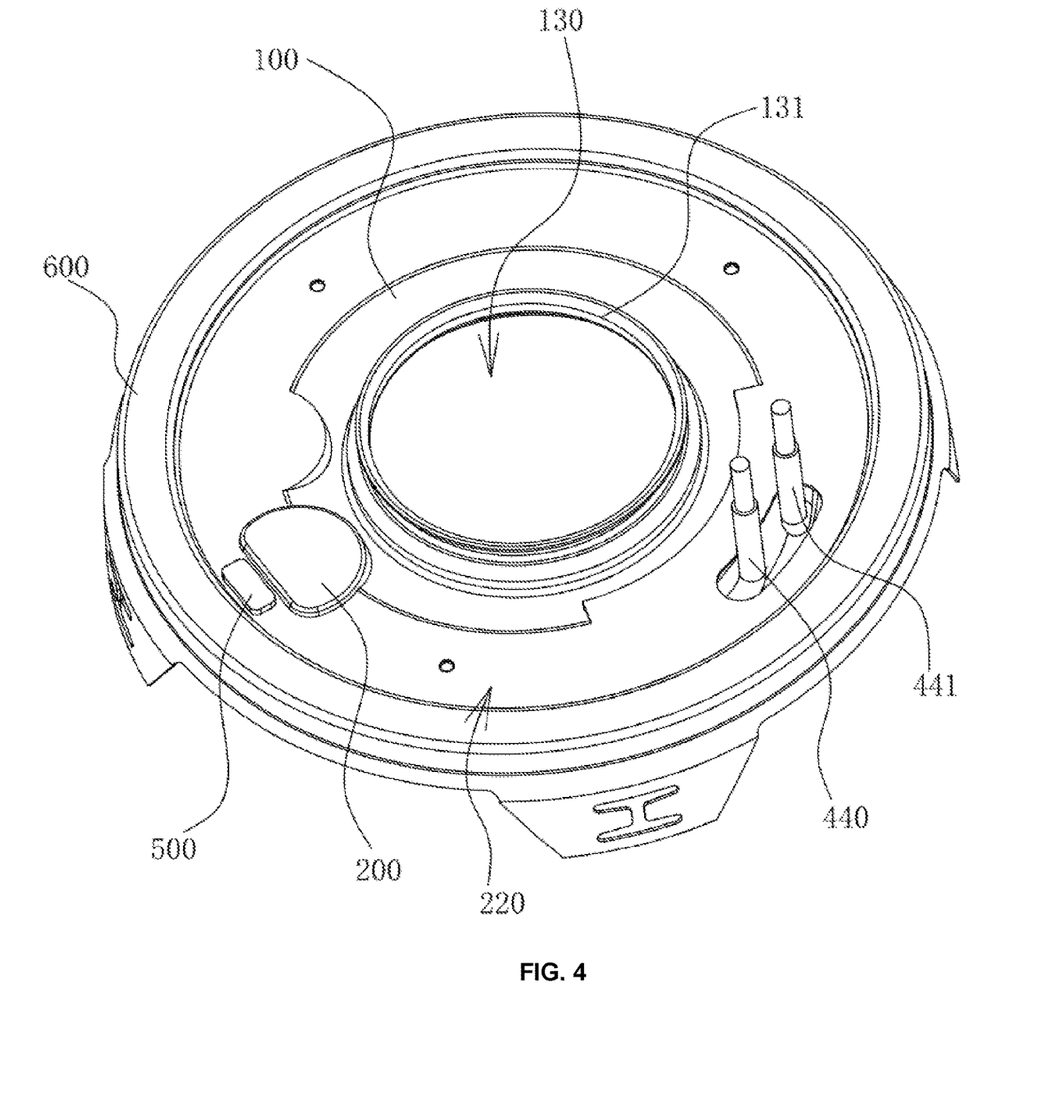
FIG.4 illustrates a partial structural schematic diagram of a heating pump cover provided by an embodiment of the present disclosure.

Referencing to FIG.1, FIG.2, and FIG.4, the present embodiment provides a heating pump cover, comprising: a cover body 100, a temperature control device 300, a raised part 200, and a heating body 400. The cover body 100 has a first surface 110 applied to contacting a liquid, and a second surface 120, opposite to the first surface 110, in order to facilitate to describe a structure, the cover body 100 adopts a cover body 100 in a round shape, take the cover body 100 being placed horizontally as an embodiment, a side facing upwards is upper, a side facing downwards is lower, that is, the first surface 110 is a lower surface, and the second surface 120 is an upper surface. Taking a side facing a center of the cover body 100 in the round shape as an inside, and a side away from the center of the cover body 100 in the round shape as an outside, an axial direction of the cover body 100 in the round shape as an axis of the present embodiment, and a radial direction of the cover body 100 in the round shape as a radial direction of the present embodiment; structures of other parts in the present embodiment are all described based on the directions. Referencing to FIG.2, FIG.3, the temperature control device 300 is arranged on the second surface 120 of the cover body 100, the temperature control device 300 has a function of sensing the temperature, being able to sense the temperature by contacting the second surface 120. The raised part 200 is arranged on the second surface 120, and a side of the raised part 200 locating on the first surface 110 forms a groove 210, the groove 210 is arranged on a lower part of the raised part 200, while the temperature control device 300 is arranged on an upper surface of the raised part 200. The heating body 400 connects fixedly to the first surface 110, and a part region of the heating body 400 covers an opening of the groove 210, a part of the heating body 400 locating in the groove 210 has a first region 410 and a second region 420, the first region 410 connects with an inner wall of the groove 210, and the second region 420 is arranged at an interval with the inner wall of the groove 210. Taking a cross-section passing through an axis and a radial direction as an embodiment, in an outer contour of the heating body 400, the upper surface of the heating body 400 is radially arranged as the first region 410 and the second region 420, and the first region 410 connects to the inner wall of the groove 210, being able to perform a heat conduction directly, while the second region 420 and the inner wall of the groove 210 are separated by a predetermined gap, which is convenient for water flowing into the predetermined gap and conducting the temperature of a water flow. The raised part 200 balances the temperatures of both parts before conducting to the temperature control device 300.

A working principle of the heating pump cover provided in the present embodiment is as follows: arranging the raised part 200 on the cover body 100, and connecting the temperature control device 300 directly to the raised part 200, a side of the raised part 200 locating on the first surface 110 forms the groove 210, making the first region 410 of the heating body 400 connect with the inner wall of the groove 210, and the second region 420 be arranged at an interval with the inner wall of the groove 210, so the water flow may flow through an interval between the second region 420 and the groove 210, and the temperature of the water flow is transferred to the temperature control device 300 through a heat transfer by the raised part 200, thus the temperature of the water flow in the pump can be sensed; also, by connecting the first region 410 with the inner wall of the groove 210, it makes the heat in the heating body 400 be directly conducted through the raised part 200; by the raised part 200, the heat conducted by a connection place of the first region 410 and the heat of the water in the interval is conducted to the temperature control device 300 on the raised part 200, that makes the heat be sensed directly by the temperature control device 300 on the raised part 200, and makes the heat be able to be balanced in the raised part 200, so as to monitor the water temperature in a pump body 700, and make the temperature control device act in time when an abnormal case happens including there is no water or less water, to avoid causing any security incidents.

A beneficial effect of the heating pump cover provided by the present embodiment is at least as follows: by adopting the first region 410 of the heating body 400 located at a position of the groove 210 connecting to the groove 210, and the second region 420 being arranged at an interval with the groove 210, a heat transfer function is therefore realized, and the heat transfer can be sensed by the temperature control device 300 more sensitively. There is no heat-sensitive sheet needed between the temperature control device 300 and the cover body 100, thus the parts of the pump cover is reduced, the assembly process and the complexity is lowered, and the production cost is reduced.

It should be noted that, the part of the heating body 400 locating in the groove 210 proposed in the present solution, wherein a method of a part region connecting to the inner wall of the groove 210 can be arranged in a plurality of various ways, including welding or bonding, while a method of arranging another part and the inner wall of the groove 210 in an interval can be in a plurality of various ways, including bending the heating body 400 into different forms. However, no matter which form is adopted, as long as a part of the region is welded with the inner wall of the groove 210, while another region is arranged in an interval with the inner wall of the groove 210, it is possible to solve the problem in the prior art, and achieve a corresponding effect.

Referencing to FIG.1, FIG.2, and FIG.3., further, taking a cross-section through an axis and in a radial direction as an example, an upper surface of an outer contour of the heating body 400 is arranged following a radial direction as a first region 410 and a second region 420. A relative position of the first region 410 and the second region 420 can be arranged in various forms, in an embodiment, they are in a radial direction, the second region 420 locates on one side or both sides of the first region 410. So the heating body 400 has at least a part connecting with the groove 210, and a part forming a gap with the groove 210. The second region locating either on an inner side, an outer side, or both sides, can all solve the problem in the prior art and achieve a corresponding effect.

In the present embodiment, the first region 410 is arranged in a direction away from the center of circle, that is, the first region 410 locates outside an upper surface of the heating body 400; the second region 420 is arranged in a direction close to the center of circle, that is, the second region 420 locates inside the upper surface of the heating body 400. Arranging the first region 410 outside, facilitates to weld the heating body 400 and the inner wall of the groove 210, making a relatively small part of the first region 410 conducts heat; and arranging the second region 420 inside, facilitates to form a gap big enough between the second region 420 and the groove 210 to accommodate the water flow. In such a way, it is better for a temperature sensing effect of the water flow, making a temperature sensing of the water flow in the heating pump more accurate. It is easy to consider that, it may also exchange both positions of the first region 410 and the second region 420, before achieving a same temperature sensing function.

Referencing to FIG.3, further, the second region 420 is an inclined surface 421, and the inclined surface 421 approaches gradually to the center of the cover body 100 along a direction from top to bottom. Arranging the second region 420 as an inclined surface 421, making a space between the second region 420 and a bottom inner wall and a side inner wall of the groove 210 larger, so that there is a larger space to accommodate the water flow, and a heat conduction to the water flow will be more sufficient, thereby facilitates to conduct heat of the water flow.

Referencing to FIG.3, further, an inner sidewall 211 of the groove 210 is arranged inclined and an inclined direction is as same as a direction of the inclined surface 421. Specifically, the groove 210 comprises the inner sidewall 211 locating on a side and a bottom inner wall 212 locating above. Arranging the inner sidewall 211 of the groove 210 inclined and inclined in a same direction as the inclined surface 421, it makes an opening of the groove 210 splay out into a "V" shape, to enlarge the opening, and when the heating body 400 covers the opening of the groove 210, the splayed out opening may still accommodate the water flow, convenient for the water flow to conduct heat.

Referencing to FIG.2 and FIG.3, further, in the present embodiment, between the heating body 400 and the first surface 110, it may adopt a fixing method of welding or bonding. And between the first region 410 and the groove 210, there is a thermally conductive filler 430 filled in, while the first region 410 connects to the inner wall of the groove 210 through the thermally conductive filler 430. The thermally conductive filler 430 contributes to a heat conduction, making the temperature control device 300 be able to sense temperature more sensitively and respond quickly, so as to achieve a faster control. If a bonding method is adopted, the thermally conductive filler is then bonded to the first region 410 and the inner wall of the groove 210 through a high-temperature adhesive.

The present embodiment adopts a welding method to connect the first region 410 to the inner wall of the groove 210, and the thermally conductive filler 430 is a nickel-based solder or a copper-based solder. The first region 410 and the groove 210 are connected by the welding method, and after welding, the first region 410, the side inner wall and a part of the bottom inner wall of the groove 210 are connected into a whole, so that the heat of the heating body 400 is able to be directly conducted to the raised part 200, thus when there is no water flow in the pump body 700 but a dry burning is performing, the heat will be rapidly conducted by the raised part 200, thus quickly transmitted to the temperature control device 300, to control the temperature control device 300 to cut off a power supply within a predetermined time, to avoid a plurality of unsafe accidents including the pump melting and fire happening.

Further, the raised part 200 and the cover body 100 are formed integrally. The raised part 200 and the cover body 100 are formed integrally by a direct stamping, a process of the stamping is simple, but forms a structure of the raised part 200 and the cover body 100 quickly, having high production efficiency.

Referencing to FIG.3, further, the second surface 120 has an annular groove 220 arranged, the raised part 200 may be arranged in the annular groove 220, and a partial area of the first surface 110 locating below the annular groove 220 connects to the heating body 400. An upper surface of the cover body 100 sinks to form the annular groove 220. A side of the annular groove 220 facing downward protrudes and forms a convex surface. The convex surface may provide a welding position for the heating body 400, to facilitate a connection to the heating body 400. Further, the annular groove 220 makes a bend on a surface of the cover body 100, which can strengthen a structural strength of the cover body 100 and improve a stability of the cover body 100.

Referencing to FIG.4, further, the annular groove 220 has a heat-conducting portion 500 arranged inside, the heat-conducting portion 500 and the raised part 200 are arranged at an interval; the temperature control device 300 contacts both the heat-conducting portion 500 and the raised part 200. By arranging the heat-conducting portion 500 additionally on a side of the raised part 200 along a radial direction, the heat of the heating body 400 and the heat of the water flow in the pump can be conducted not only through the raised part 200, but also through the heat-conducting portion 500, that makes a range larger that the temperature control device 300 is able to sense, having more temperature-sensitive points, so that a temperature-sensitive sensitivity of the temperature control device 300 is stronger, having a better temperature-sensitive effect.

Figure 5:
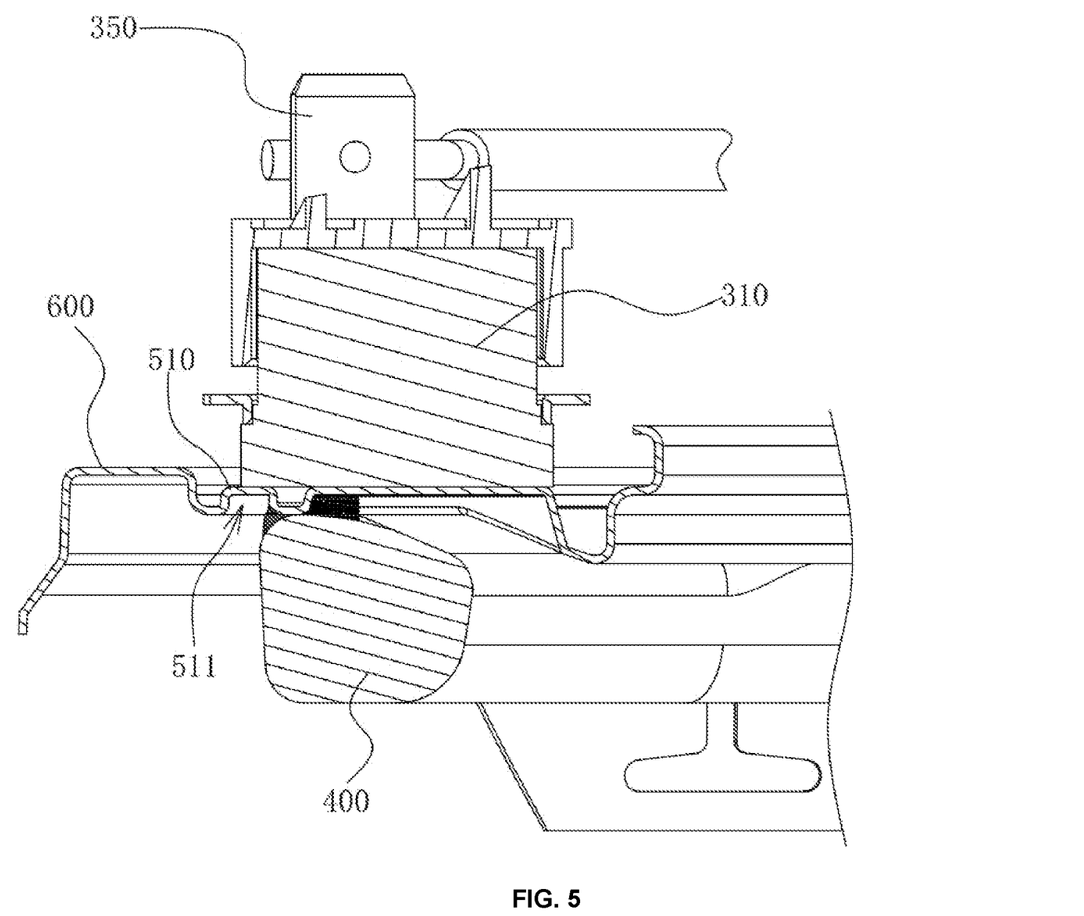
FIG.5 illustrates a cross-sectional view of a structure of a heat conducting portion of a heating pump cover provided by an embodiment of the present disclosure.

The heat-conducting portion 500 can be arranged in a plurality of various forms, wherein two forms described below are applied for a structural description, specifically:

Shown as FIG.5, a first form of the heat-conducting portion 500 is: the heat-conducting portion 500 comprises a heat-conducting convex plate 510, while the heat-conducting convex plate 510 and the cover body 100 are formed integrally. The heat-conducting convex plate 510 and the raised part 200 as well as the cover body 100 are all formed integrally, and a groove is formed between the heat-conducting convex plate 510 and the raised part 200, the groove may not only be arc-shaped, straight-line-shaped, but also be curved or more shapes. A concave groove 511 is formed in a lower part of the heat-conducting convex plate 510, and the concave groove 511 accommodates the water flow. An inner wall of the concave groove 511 can further connect to the first region 410 of the heating body 400. Therefore, a part area of the heat-conducting convex plate 510 conducts the heat of the heating body 400, and another part area of the region conducts the heat of the water flow. Being used together with the raised part 200, an efficiency of the heat conduction is improved, making the temperature control device 300 more sensitive to a temperature, achieving a faster action response.

Figure 6:
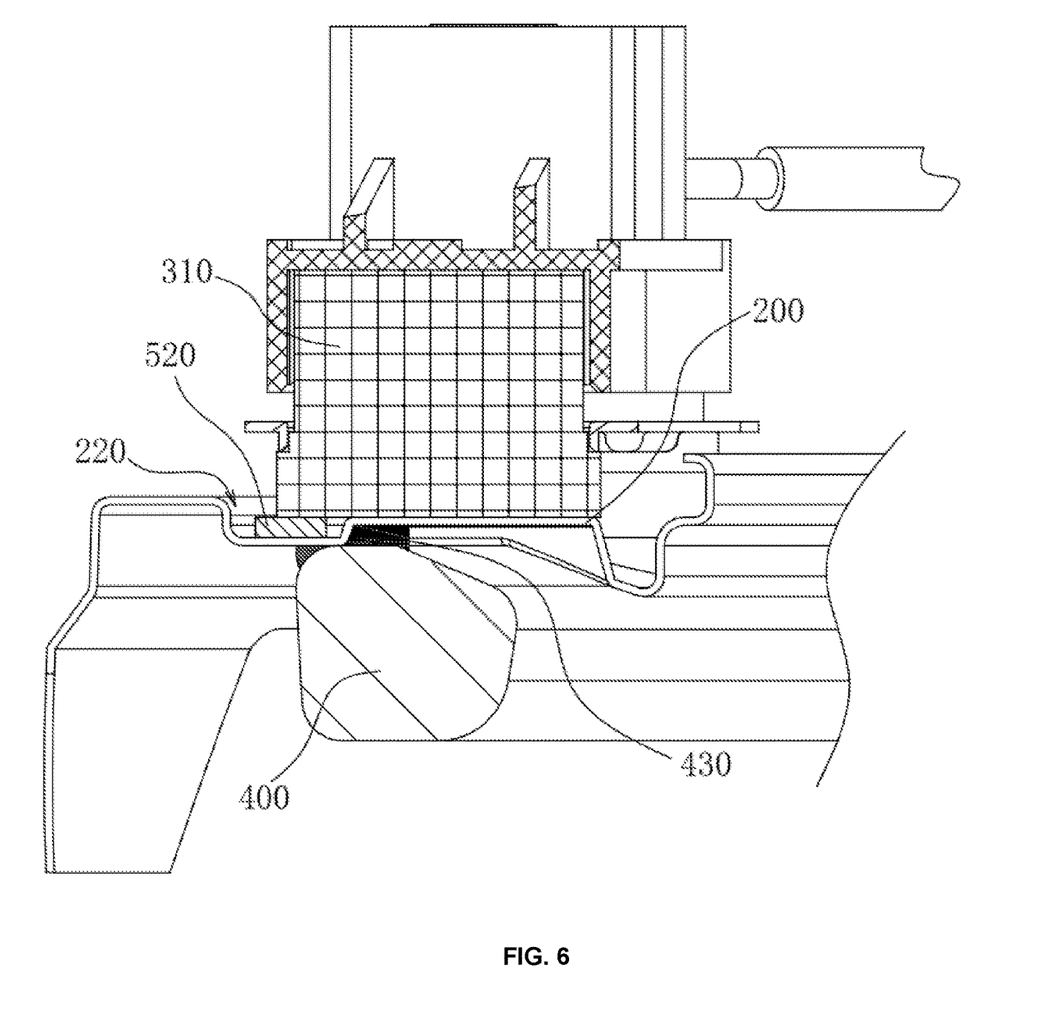
FIG.6 illustrates a cross-sectional view of another structure of a heat conducting portion of a heating pump cover provided by an embodiment of the present disclosure.

Shown as FIG.6, a second form of the heat-conducting portion 500 is: the heat-conducting portion 500 comprises a heat-conducting block 520, the heat-conducting block 520 is welded or bonded inside the annular groove 220, while the heat-conducting block 520 and the raised part 200 are arranged at an interval. Usually there is no need to add the heat-conducting block 520 additionally, however in a case that a contact area between the temperature control device 300 and the raised part 200 is not large, resulting in a temperature sensing unstable, then welding the heat-conducting block 520 in a small piece into the annular groove 220, while the temperature control device 300 connects to the heat-conducting block 520 and the raised part 200, so that the temperature control device 300 and the heating body 400 have more heat-conducting areas, so as to realize a stable temperature sensing for the temperature control device 300. In addition, the heat-conducting block 520 and the raised part 200 are arranged at an interval, in such a way, a part of the temperature control device 300 can contact the heat-conducting block 520 and sense the temperature, while another part can sense the temperature through the raised part 200, thus the temperatures from two places may be equilibrated accordingly, making the temperature having been equilibrated be sensed directly by the temperature control device 300, so as to achieve a more stable and accurate temperature sensing effect. By transferring the heat through two places, an efficiency of the heat transfer is improved; the temperature control device 300 is more sensitive to the temperature, also achieving a faster action response.

Figure 8:
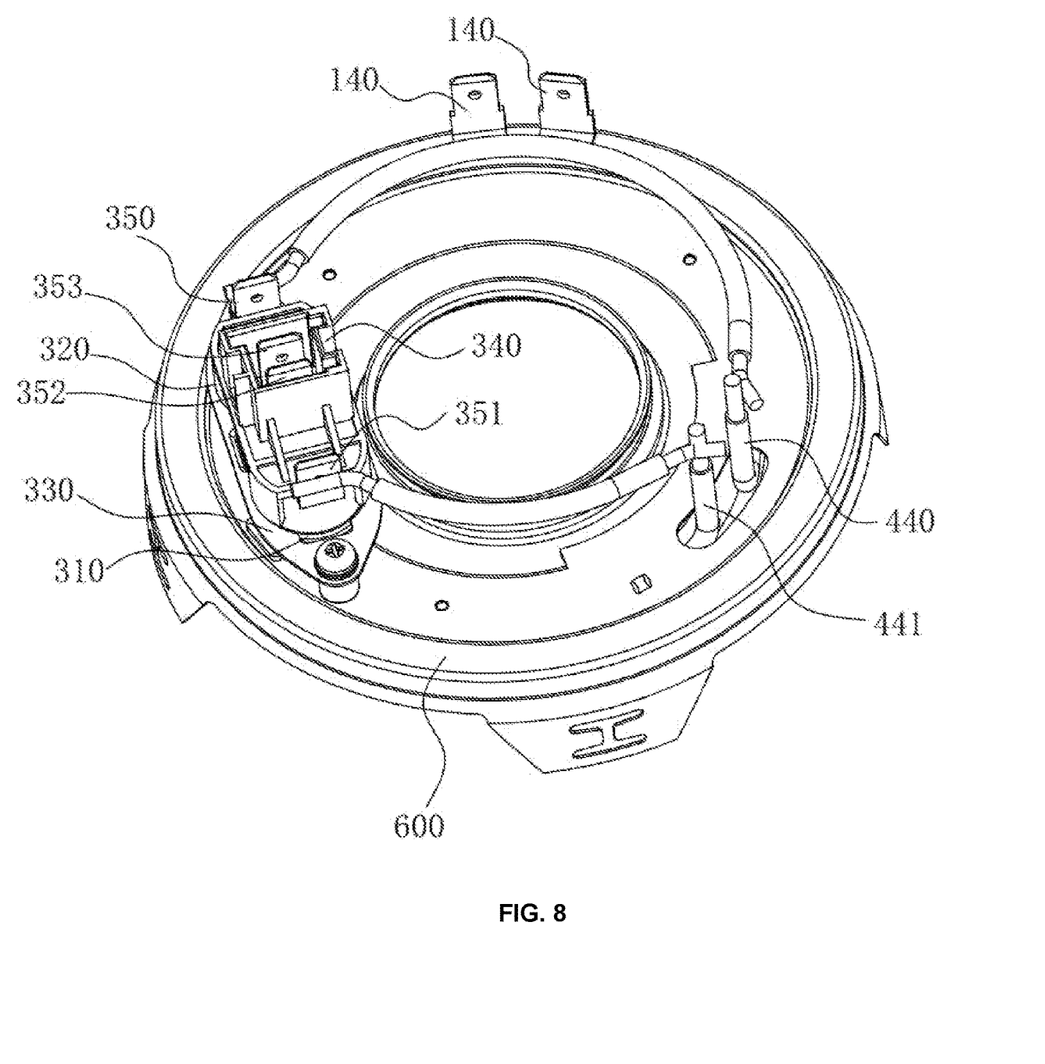
FIG.8 illustrates a structural schematic diagram of a heating pump cover provided by an embodiment of the present disclosure.

Shown as FIG.3, FIG.4, and FIG.8, further, along a circumferential direction, the upper surface of the heating body 400 connects to the first surface 110 in whole. In the present embodiment, an outer contour of the heating body 400 on a horizontal plane is arc-shaped, and both ends of the heating body 400 in an arc-shape are connected respectively to a first connection end 440 and a second connection end 441, and an area of the heating body 400 covering the opening of the groove 210 is partially welded on the first surface 110, while the upper surface of the heating body 400 is totally welded on the first surface 110 except for the area covering the groove 210, also the first connection end 440 and the second connection end 441 penetrate through the cover body 100 before extending to a side of the second surface 120 (an opening is arranged in the cover body at a penetration point, and the opening is sealed), and connecting with a wire to achieve an electric heating. In a specific structure, the first connection end 440 transits and connects with the heating body 400 along a predetermined angle, and the second connection end 441 transits and connects to the heating body 400 at the predetermined angle. Through the predetermined angle, the first connection end 440 and the second connection end 441 are able to be smoothly connected to the heating body 400. The first connection end 440 and the second connection end 441 penetrate through the cover body and electrically connect to the temperature control device 300. The first connection end 440 and the second connection end 441 are energized as two electrodes of the heating body 400, thus a circuit of the heating body 400 can be controlled to be turned on or off by the temperature control device 300.

In the present embodiment, the heating body 400 may be arranged in various forms, in one embodiment, a heating wire is comprised, and a heat transfer tube sheathed outside the heating wire. The heat transfer tube is welded on the first surface 110, and an outer contour of a cross-section of the heating body 400 is one of a circle, an ellipse, a trapezoid, and a rectangle, and other shapes easy to be thought of, such as a shape with one side inclined in the present embodiment, or a shape with multiple sides inclined, or multiple sides in an arc shape.

Figure 7:
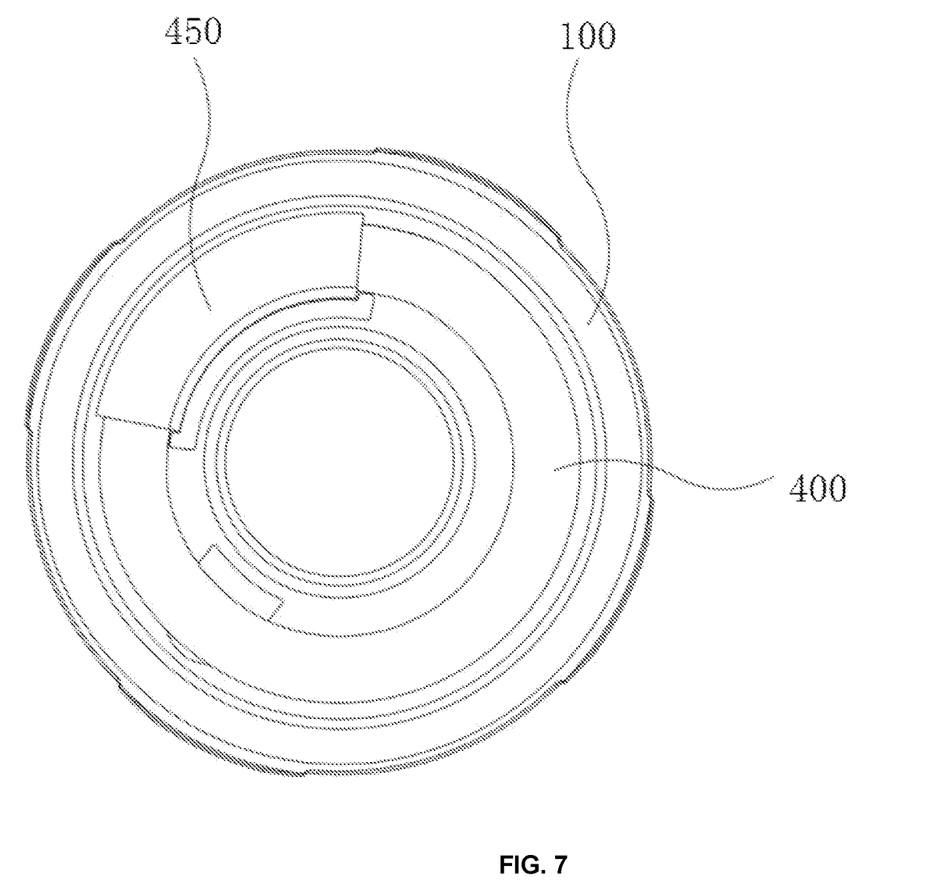
FIG.7 illustrates a bottom view of a heating pump cover provided by an embodiment of the present disclosure.

As shown in FIG.4 and FIG.7, further, the first surface 110 of the cover body 100 has a water blocking portion 450 fixedly connected, and the water blocking portion 450 covers two penetration positions in the cover body 100 for the first connection end 440 and the second connection end 441. The water blocking portion 450 may be a water blocking cover or a water blocking plate. a side of the penetration position facing upward can be sealed with a sealant, and a side of the penetration position locating in the water flow can be covered by the water blocking portion 450, so that the first connection end 440 and the second connection end 441 of both ends of the heating body 400 do not contact with the water. In addition, the water blocking portion 450 can also effectively avoid a disturbance of the water flow, reduce a water resistance, and reduce a water head loss, thereby achieving an effect of improving a thermal efficiency.

Further, the water blocking portion 450 is welded or brazed on both ends of the heating body 400, and connecting with the heating body 400 to form an annular shape. A shape of the heating body 400 is arranged into an annular shape adapting to the cover body 100 in a round shape. During an actual installation, the heating body 400 is installed on a side of the cover body 100 close to the water flow for heating. Due to a self structure limitation, the heating body 400 has a notch existing in the annular shape, reducing the thermal efficiency. Therefore, by overlaying and connecting the water blocking portion 450 with the heating body 400, it forms a complete annular shape together with the heating body 400. By arranging the water blocking portion 450 at the notch mentioned above, and making the cover body 100 achieve an effect of sealing, a turbulence of the water flow is avoided, a water resistance is lowered, and a water head loss is reduced, thereby an effect of improving the thermal efficiency is achieved.

As shown in FIG.4, further, an edge of the cover body 100 has a sealing portion 600 arranged, and the sealing portion 600 may be arranged in various forms. Shown as FIG.5 and FIG.9, the sealing portion 600 is arranged in various forms, in the present embodiment, the sealing portion 600 is annular and has two sides in the radial direction, one side of the sealing portion 600 connects with the cover body 100 along a preset angle, while the cover body 100 and the sealing portion 600 are arranged integrally; another side of the sealing portion 600 bends upward to form a first bent portion 610, a side of the first bent portion 610 facing the cover body 100 forms a limiting groove 611, and the limiting groove 611 is applied to limiting the pump body 700. In a specific structure, the sealing portion 600 connects to an edge of the cover body 100, and an inward side of the sealing portion 600 is in a continuation with the annular groove 220 (or is an outer side wall of the annular groove 220). The sealing portion 600 connects with the annular groove 220, making the surface of the heating pump cover form a convex structure, thereby increasing a structural strength of the heating pump cover in a whole. While an outer edge of the sealing portion 600 bends upward to form the first bent portion 610, thereby forming the limiting groove 611. When installing the pump body 700, an upper end of the pump body 700 can be directly engaged in the limiting groove 611, so that the pump body 700 locates in the limiting groove 611 without being displaced along the radial direction. That makes an installation of the pump body 700 and the heating pump cover more convenient.

Figure 9:
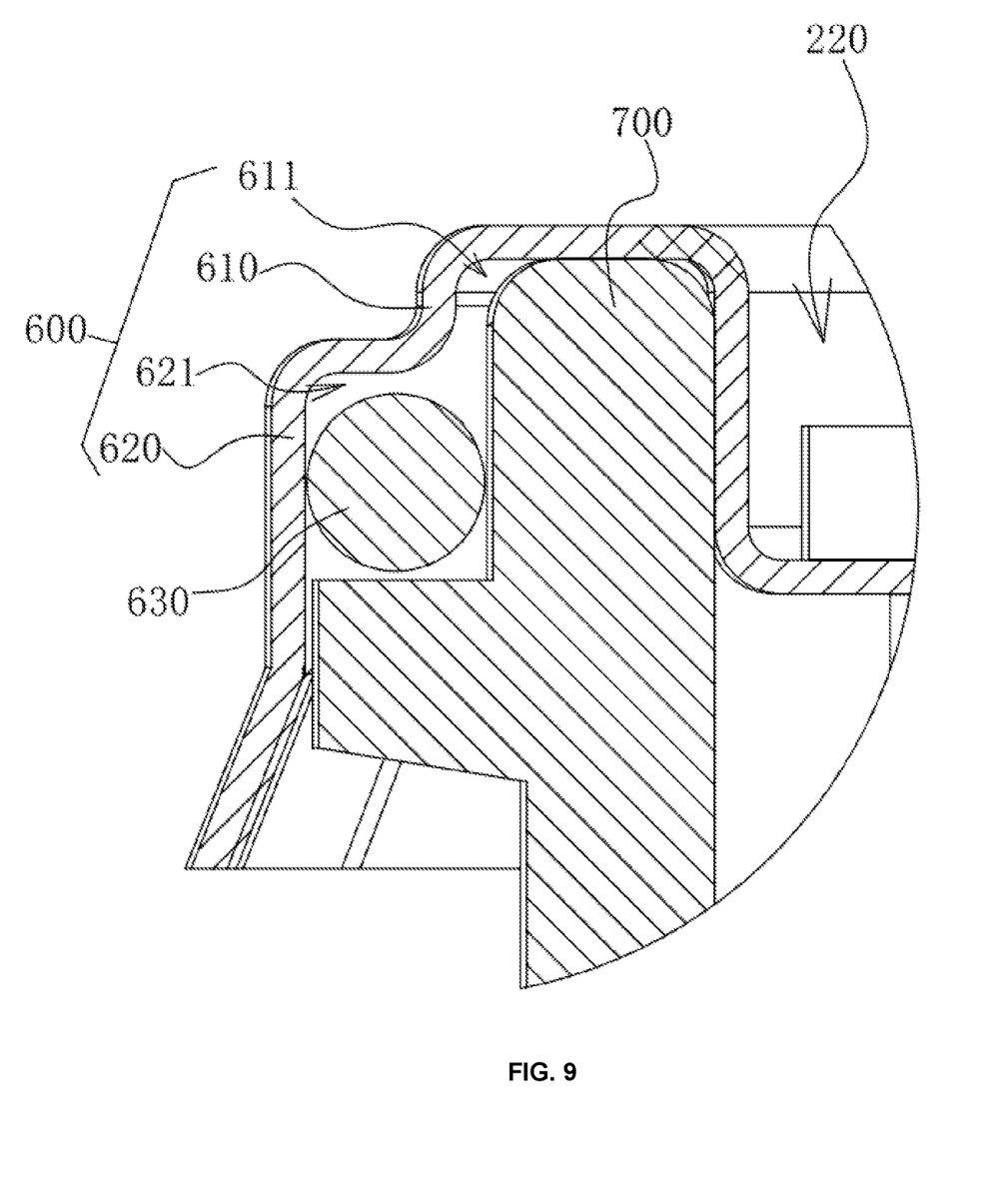
FIG.9 illustrates a cross-sectional view of a sealing portion of a heating pump cover provided by an embodiment of the present disclosure.

Further, the sealing portion 600 further comprises a second bent portion 620, the second bent portion 620 is arranged on an outer side of the first bent portion 610, and the second bent portion 620 is applied to engaging the pump body 700. By deforming an outer edge of the sealing portion 600, and forming the second bent portion 620 on the outer side of the first bent portion 610, while an outer wall of the pump body 700 has a mounting convex plate arranged, the second bent portion 620 clamps and engages the mounting convex plate, so as to realize an engagement with the pump body 700.

Further, a side of the second bent portion 620 facing the cover body 100 forms a sealing space 621, and having a sealing ring 630 arranged inside the sealing space 621, while the sealing ring 630 is filled between an inner wall of the second bent portion 620 and an outer wall of the pump body 700. When the pump body 700 is installed inside the second bent portion 620, the sealing ring 630 is sleeved on the pump body 700, the pump body 700 and an inner wall of the second bent portion 620 press the sealing ring 630 in the sealing space 621, to make the sealing ring 630 fill in the sealing space 621 totally, thereby realizing a sealing of a connection place between the heating pump cover and the pump body 700, having a sealing effect good, and a disassembly and assembly convenient.

Referencing to FIG.1 and FIG.8, the temperature control device 300 in the present embodiment may comprise a temperature sensor 310 only, a temperature sensing end of the temperature sensor 310 abuts on the upper surface of the raised part 200. And the temperature control device 300 may further comprise the temperature sensor 310 and a temperature safety device. The temperature safety device may be a fuse 320, wherein the temperature sensor 310 senses that the water on a side of the cover body 100 having the heating body 400 arranged is at a low temperature, the temperature sensor 310 will control an electric heating tube to heat up and raise the temperature. When it is heated to a preset temperature, the temperature sensor 310 will be disconnected, making the heating body 400 stop heating the water in the pump; when the temperature of the water flow in the pump drops to a certain temperature, the temperature sensor 310 will be reconnected, and resume achieving the temperature control to the heating pump. Therefore, it is possible to monitor the temperature of the water in the pump body 700, and to make the temperature control device 300 act in time when there is an abnormal situation, such as no water or little water, to avoid a safety accident. The fuse 320 senses a high temperature, when the side of the cover body 100 having the heating body 400 arranged is in an empty burning state without any water, a temperature of the raised part 200 rises rapidly, and when it reaches a preset high temperature, the fuse 320 is disconnected directly, and controls the heating body 400 stop working, so as to avoid a damage to an integrated electric heating pipe of the dishwasher pump due to the empty burning. To make the fuse 320 work again, it is needed to replace the fuse. Therefore, the temperature control device 300 adopting a form of the temperature safety device and the temperature sensor 310, provides a plurality of temperature control methods to heat the pump body 700, which greatly improves a pump safety.

In addition, it should be noted that, an outer contour of the temperature sensor 310 and the fuse 320 in the present embodiment may be a cylindrical shape, and may also be square, triangle, and other polygons.

Shown as FIG.8, further, the temperature control device 300 further comprises: a fixed plate 330 and a control plug 340. The fixed plate 330 is fixed on the second surface 120, the fixed plate 330 is a heat conducting board, the temperature controller connects to the fixed plate 330, and a bottom of the temperature controller is overlaid and arranged on the raised part 200; the temperature safety device connects to the fixed plate, and a bottom of the temperature safety device is overlaid and arranged on the second surface; the control plug 340 is fixedly arranged on the temperature controller and the temperature safety device, both sides of the control plug 340 have a plurality of reinforcing ribs arranged respectively, an end of the heating body 400 connects electrically to a first insertion plate 350 and a second insertion plate 351 arranged on both sides of the control plug 340. In a specific structure, the fixed plate 330 can adopt a form of a bracket, or a Z-shaped bent plate, and more, while the shape may be arranged according to an implementation need. The fixed plate 330 can fixedly connects to the cover body 100 by a plurality of screws, rivets, and more, so that both the temperature controller and the temperature safety device connecting to the fixed plate can be secured due to being fixed tightly and reliably by fixing the fixed plate and the cover body 100; the fixed plate 330 may act as a heat transfer element and be able to transfer heat to the temperature control device 300. The end of the heating body 400 connects electrically to the first insertion plate 350 and the second insertion plate 351 arranged on both sides of the control plug 340, achieving a connection in series of the temperature sensor 310, the heating body 400 and the fuse 320, so as long as either the temperature sensor 310 or the fuse 320 gets disconnected, a power of the heating body 400 can be cut off, making the heating body 400 stop heating.

The fixed plate 330 has a plurality of riveting holes arranged matching the temperature controller and the fuse 320, the temperature controller and the fuse 320 are engaged into the riveting holes, making the temperature controller and the fuse 320 form a set of modules, and during an assembly, it only needs to connect the module in a whole to the cover body 100, thereby an assembly of the temperature control device 300 in a whole is facilitated. .

As shown in FIG.8, further, the control plug 340 comprises a third insertion plate 352 and a fourth insertion plate 353, the third insertion plate 352 and the fourth insertion plate 353 are arranged in an interval; the third insertion plate 352 and the fourth insertion plate 353 connect in a circuit respectively with the temperature controller and the temperature safety device. The third insertion plate 352 and the fourth insertion plate 353 form a plug interface, and it only need to arrange a matched connector, before connecting the third insertion plate 352 and the fourth insertion plate 353 through the connector, so as to achieve a fast connection between the circuits, facilitating a circuit connection for the heating pump cover. In addition, the third insertion plate 352 and the fourth insertion plate 353 can also directly connect to a power supply circuit by welding, or by plugging through a plurality of standard terminals, to achieve a connection with the power supply circuit. The third insertion plate 352 and the fourth insertion plate 353 are in parallel, and a distance between the third insert and the fourth insert is 5 mm±1 mm.

In addition, it should be noted that, both the temperature sensor 310 and the fuse 32 may be arranged in a plurality, for example, in a form of one temperature sensor 310 and two fuses 320, and the one temperature sensor 310 and the two fuses 320 are connected in series, so that by arranging the fuses 320 at a plurality of different positions of the cover body 100, it is possible to sense the temperatures conducted by the cover body 100 at different positions, that improves the sensitivity of the temperature sensing; and the safety can be improved.

As shown in FIG.4, further, the center of the cover body 100 has a water inlet 130 arranged, the water inlet 130 has a surrounding edge 131 arranged, and the surrounding edge 131 is arranged continuously along a circumference of the water inlet 130. The water inlet 130 can connect to a water inlet pipe, and by the water inlet pipe, the pump is charged or discharged. Limiting a position of the water inlet pipe by the surrounding edge 131, it facilitates an installation of the heating pump cover and the water inlet pipe.

The cover body 100 has a plurality of grounding terminals 140 arranged, and each grounding terminal 140 has a connecting hole arranged, while the grounding terminals 140 are fixedly overlaid and arranged on the cover body 100. The grounding terminals 140 are applied for grounding, to conduct an electricity on the pump cover to the ground in time, to improve the electrical safety of an electrical appliance.

Based on a same concept, the present disclosure further provides a heating pump, comprising a pump body and the heating pump cover described above; the heating pump cover connects detachably to the pump body.

All described above are a plurality of preferred embodiments of the present disclosure only, and are not intended to limit the present disclosure, any modifications, equivalent replacements and improvements made within the spirit and principles of the present disclosure should belong to the scope of protection in the appended claims of the present disclosure.

What is claimed is:

1. A heating pump cover, comprising:
   a cover body, wherein the cover body has a first surface applied to contact a liquid, and a second surface, opposite to the first surface;
   a temperature control device, wherein the temperature control device is arranged on the second surface;
   a raised part, wherein the raised part is arranged on the second surface, and a side of the raised part located on the first surface forms a groove, while the temperature control device is arranged on the raised part; and
   a heating body, wherein the heating body fixedly connects to the first surface, wherein a part of the heating body located in the groove has a first region and a second region, and wherein the first region connects with an inner wall of the groove, and the second region is arranged at an interval with the inner wall of the groove, wherein the second surface has an annular groove, wherein a partial area of the first surface located below the annular groove connects to the heating body, and wherein a heat-conducting portion is arranged inside the annular groove, wherein the heat-conducting portion and the raised part are arranged at an interval, and the temperature control device is in contact with both the heat-conducting portion and the raised part.

2. The heating pump cover according to claim 1, wherein the heat-conducting portion comprises a heat-conducting block, wherein the heat-conducting block connects to a groove bottom surface of the annular groove.

3. The heating pump cover according to claim 1, wherein along a circumferential direction, the upper surface of the heating body connects to the first surface in whole.

4. The heating pump cover according to claim 1, wherein both ends of the heating body connect with a first connection end and a second connection end;
   wherein the first connection end connects transitionally to the heating body along a predetermined angle;
   wherein the second connection end connects transitionally to the heating body along the predetermined angle; and
   wherein the first connection end and the second connection end penetrate through the cover body and connect electrically with the temperature control device.

5. The heating pump cover according to claim 4, wherein the first surface of the cover body has a water blocking portion fixedly connected, and the water blocking portion covers two penetration positions in the cover body for the first connection end and the second connection end.

6. The heating pump cover according to claim 5, wherein the water blocking portion is welded or brazed on both ends of the heating body, and connected with the heating body to form an annular shape.

7. The heating pump cover according to claim 1, wherein an outer contour of a cross-section of the heating body is one of a circle, an ellipse, a trapezoid and a rectangle.

8. The heating pump cover according to claim 1, wherein an edge of the cover body has a sealing portion arranged, wherein the sealing portion is annular and has two sides in a radial direction, wherein one side of the sealing portion connects with the cover body along a preset angle, while the cover body and the sealing portion are arranged integrally; and
   wherein another side of the sealing portion bends upward and forms a first bent portion, a side of the first bent portion facing the cover body forms a limit groove, and the limit groove is applied to limiting the pump body.

9. The heating pump cover according to claim 8, wherein the sealing portion further comprises:
   a second bent portion, wherein the second bent portion is arranged outside the first bent portion, and the second bent portion is applied to engaging the pump body.

10. The heating pump cover according to claim 9, wherein a side of the second bent portion facing the cover body forms a sealing space, and wherein a sealing ring is arranged inside the sealing space, while the sealing ring is filled between an inner wall of the second bent portion and an outer wall of the pump body.

11. A heating pump, comprising a pump body and the heating pump cover according to claim 1, wherein the heating pump cover connects detachably to the pump body.

12. A heating pump cover, comprising:
   a cover body, wherein the cover body has a first surface applied to contact a liquid, and a second surface, opposite to the first surface;
   a temperature control device, wherein the temperature control device is arranged on the second surface;
   a raised part, wherein the raised part is arranged on the second surface, and a side of the raised part located on the first surface forms a groove, while the temperature control device is arranged on the raised part; and a heating body, wherein the heating body fixedly connects to the first surface, wherein a part of the heating body located in the groove has a first region and a second region, and wherein the first region connects with an inner wall of the groove, and the second region is arranged at an interval with the inner wall of the groove, wherein the first region is arranged on an upper surface of the heating body, at a radial direction, and the second region is arranged on one side or both sides of the first region, wherein between the first region and the groove, there is a thermally conductive filler filled in, and wherein the first region connects to the inner wall of the groove through the thermally conductive filler.

13. The heating pump cover according to claim 12, wherein the thermally conductive filler is a nickel based solder or a copper based solder.

14. The heating pump cover according to claim 12, wherein the first region is arranged outside the upper surface of the heating body, wherein the second region is arranged inside the upper surface of the heating body, wherein the second region comprises an inclined surface, and the inclined surface gradually approaches a center of the cover body in a top-to-bottom direction.

* * * * *